No. 619,649. Patented Feb. 14, 1899.
I. C. WOODWARD.
NUT AND BOLT LOCK.
(Application filed Apr. 30, 1898.)
(No Model.)
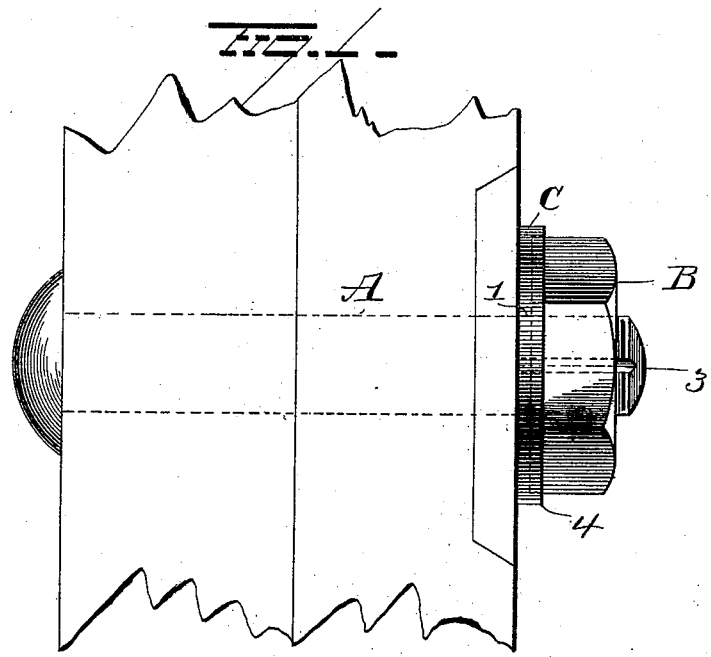
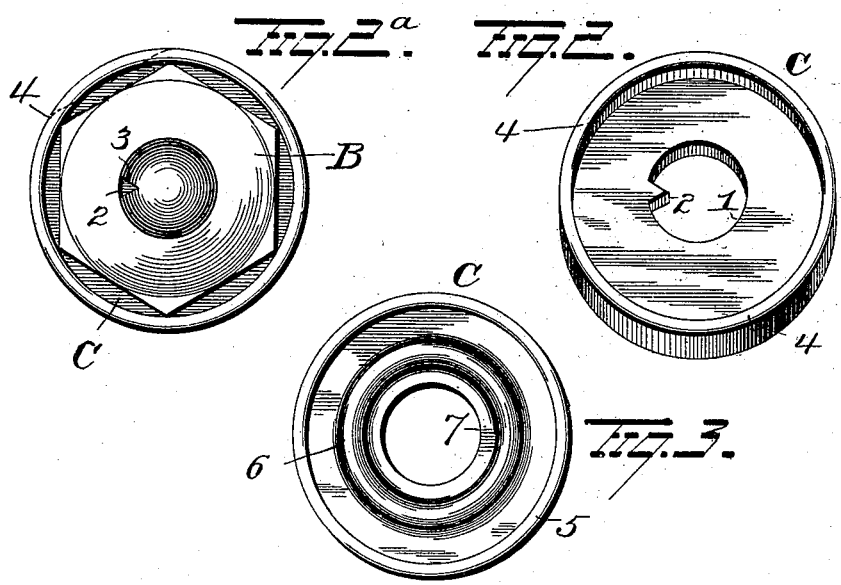
WITNESSES
E. J. Nottingham
G. F. Downing
INVENTOR
I. C. Woodward
By H. A. Seymour
Attorney

UNITED STATES PATENT OFFICE.

IRVING C. WOODWARD, OF IRON MOUNTAIN, MICHIGAN.

NUT AND BOLT LOCK.

SPECIFICATION forming part of Letters Patent No. 619,649, dated February 14, 1899.

Application filed April 30, 1898. Serial No. 679,361. (No model.)

*To all whom it may concern:*

Be it known that I, IRVING C. WOODWARD, a resident of Iron Mountain, in the county of Dickinson and State of Michigan, have invented certain new and useful Improvements in Nut and Bolt Locks; and I do hereby declare the following to be a full, clear, and exact description of the invention, such as will enable others skilled in the art to which it appertains to make and use the same.

My invention relates to an improvement in nut and bolt locks, the object of the invention being to provide a device that will preclude any possibility of the nut turning independently of the bolt and becoming loose thereon and dropping off.

A further object is to provide a lock that will be extremely simple in construction, cheap to manufacture, and which will securely hold the nut in position on the bolt.

With these objects in view the invention consists in certain novel features of construction and combinations and arrangements of parts, as will be more fully hereinafter described, and pointed out in the claims.

In the accompanying drawings, Figure 1 is a view showing the lock in its locking position. Figs. 2 and 2ª are detail views of the lock, and Fig. 3 is a view of another form of my invention.

A represents a bolt provided with the ordinary head at one end and screw-threaded at its other end to mesh with screw-threads in the nut B.

C represents a washer or lock composed, preferably, of metal softer than the bolt and nut and made in circular form, as shown. A hole 1 is provided in said washer or lock to receive the bolt, and a tooth or key 2 is provided on said washer or lock adapted to enter into a groove or keyway 3, provided in the bolt A. The washer or lock is provided with a peripheral flange or rim extension, and when the nut is screwed down to its tightened position the flange 4 will be bent at one or more points (by the use of a suitable tool) to securely clamp the nut to the washer or lock and preclude any movement thereof.

Instead of the form of washer above described I might employ such a form as shown in Fig. 3. In this form of washer a flange or rim extension 5 is provided around its edge, and the bearing-face of the washer is corrugated annularly, as at 6, whereby when the nut is screwed tight against same the hole 7, through which the bolt passes, will become gradually contracted and the metal will wedge itself against and into the threads of the bolt, and then the flange 5 can be bent against the nut and securely hold same in position.

Various other slight changes might be made in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with a threaded bolt, of a soft-metal washer, a bendable peripheral flange extending around the washer and disposed at right angles thereto, and a nut on the bolt disposed within the peripheral flange on the washer so as to normally move freely to permit said nut to be tightened on the bolt, said flanged washer being constructed and adapted to positively engage the bolt so as to be locked thereby and the peripheral flange on the washer adapted to have its concentricity disturbed whereby to prevent the nut from turning on the bolt, said washer thus coöperating with the bolt and nut to prevent both from turning independently of each other and independently of said washer, substantially as set forth.

2. The combination with a threaded bolt and a nut, of a soft-metal washer inserted under the nut and having a hole for the passage of the bolt, said washer being also provided with a corrugation, whereby the pressure of the nut on said corrugation will force the metal of the washer in locked engagement with the threaded bolt, substantially as set forth.

3. The combination with a threaded bolt and a nut, of a soft-metal perforated washer under the nut and having a circular corrugation between its periphery and the hole in the center and a bendable peripheral flange on said washer adapted to embrace the nut, substantially as set forth.

In testimony whereof I have signed this specification in the presence of two subscribing witnesses.

IRVING C. WOODWARD.

Witnesses:
EUGENE A. WOODWARD,
ALVIN POE.